Figure 1:
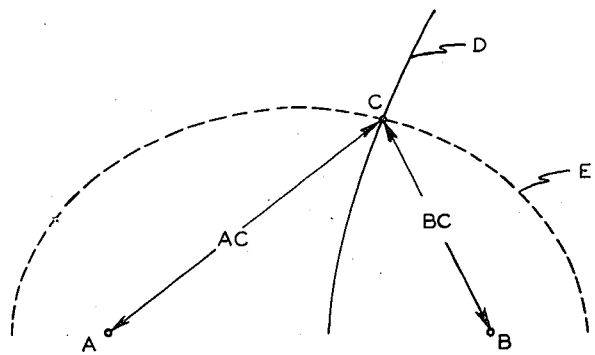

Sept. 18, 1956 G. E. VALLEY, JR 2,763,857
TWO STATION NAVIGATION SYSTEM
Filed Nov. 15, 1945 2 Sheets-Sheet 1

INVENTOR
GEORGE E. VALLEY JR.

BY
ATTORNEY

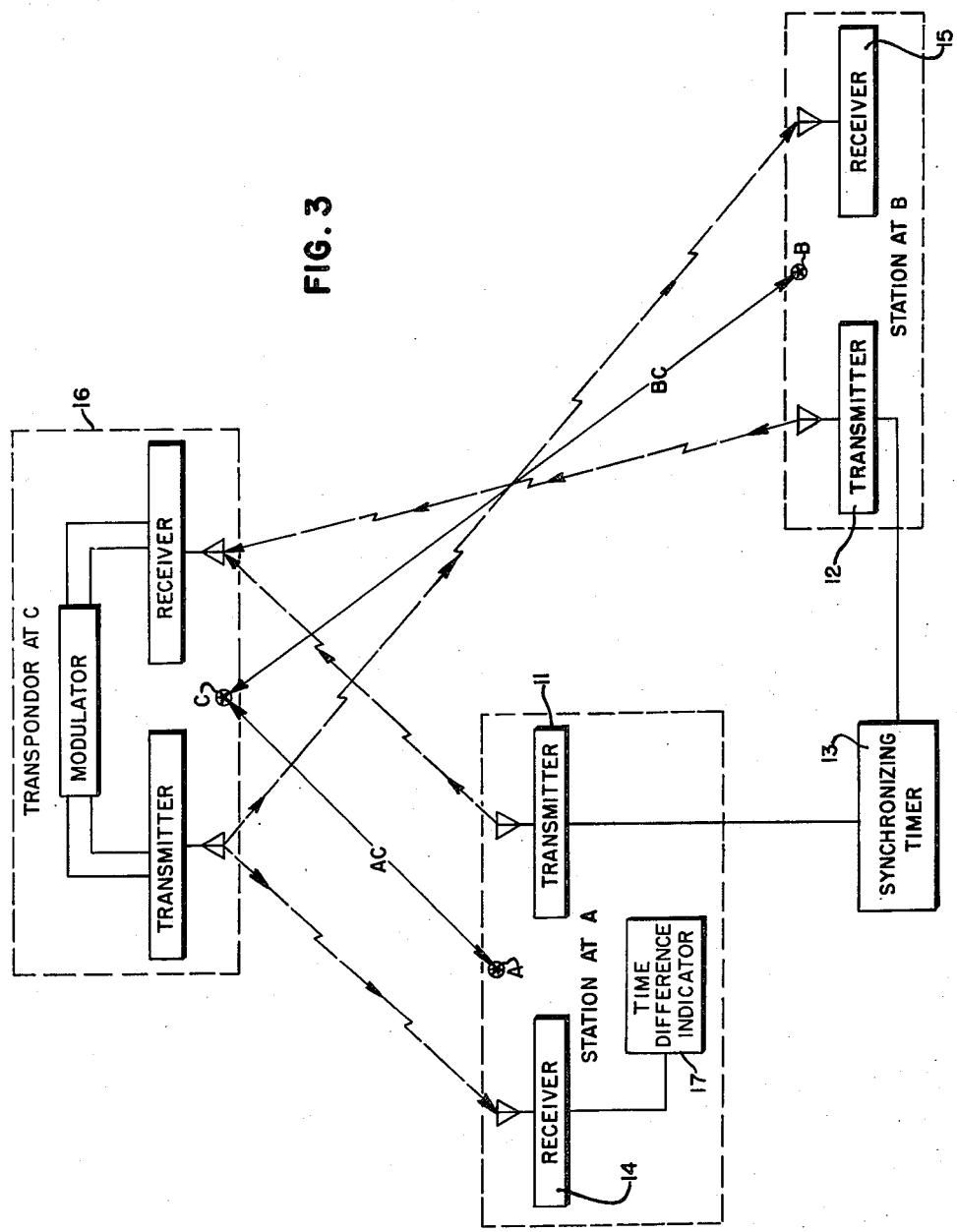

United States Patent Office 2,763,857
Patented Sept. 18, 1956

2,763,857

TWO STATION NAVIGATION SYSTEM

George E. Valley, Jr., Cambridge, Mass., assignor, by mesne assignments, to the United States of America as represented by the Secretary of the Navy Application November 15, 1945, Serial No. 628,911

6 Claims. (Cl. 343—12)

My invention relates broadly to systems of radio navigation and more particularly to an improved and more accurate two-station radio navigation system which when used in conjunction with a body equipped with the required radio beacon equipment will provide an accurate and improved system of navigation of the body.

In one prior system of radio navigation for example, as described in U. S. Patent No. 2,689,346 to J. A. Pierce et al., entitled "Long Range Navigation System, the navigational data is found by comparing the difference in time that it takes radio frequency pulses from two separate transmitting stations of known geographical location to reach the body. A curve may be drawn upon a navigation chart through all points whose distance from the aforementioned stations differs by the amount corresponding to the time differential found from the above-described observation. The body will therefore lie somewhere upon this curve. A similar and nearly coincident observation is additionally taken from two other transmitting stations of known geographical location and a second curve may likewise be plotted upon the chart. It is obvious that the position of the body will lie at the intersection of the two curves thus obtained. One disadvantage of this system is that at least two or more pairs of suitably identified transmitting stations of known position must lie within radio coverage range of the body. Another disadvantage of this system is that, in practical operation, the curves or "lines of position" obtained from the separate pairs of transmitting stations may be found to be, in certain areas of coverage, nearly parallel causing difficulty in locating the exact point of intersection and thus reducing the accuracy of the position determination.

An object of my invention is to provide a new and improved method of radio navigation of a body whose workable range will be limited only by the range capabilities of the radio equipment carried by the body and that of the associated fixed stations.

Another object of my invention is to provide a new and improved method of radio navigation of a body equipped with the required radio beacon equipment, in a given geographical area which will require the presence of only two associated fixed stations of known position within the given area.

Still another object of my invention is to provide a new and improved method of radio navigation of a body which will present the location of the body at the point of intersection of two curves which are perpendicular to each other at all locations within the radio coverage area, thus enabling the determination of the point of intersection and location of the body with great precision and accuracy.

The above and other objects of my invention will be more apparent to those skilled in the art from a consideration of the detailed description which follows taken together with the accompanying drawings.

Figure 2:
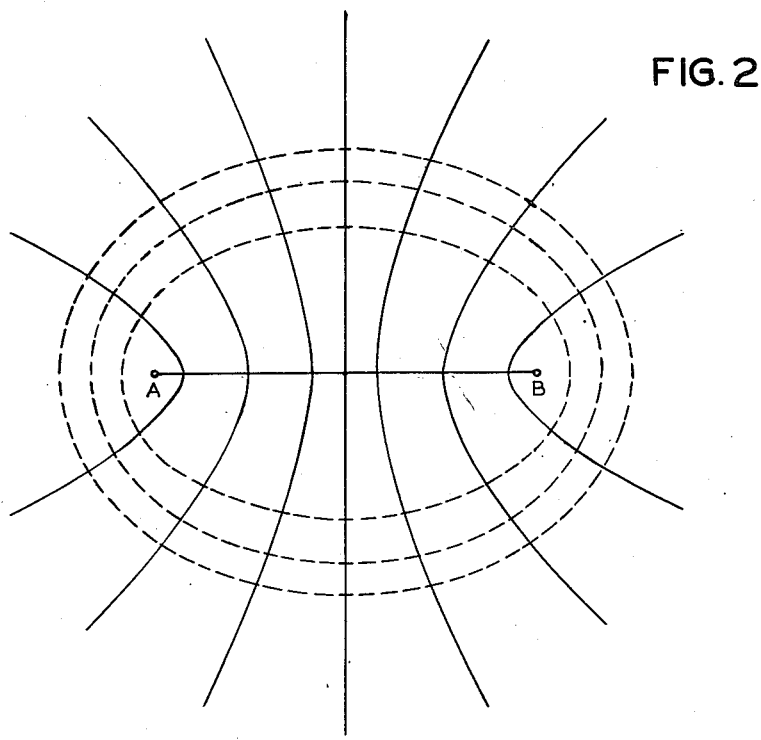

Fig. 1 illustrates the general layout of the navigating system. Fig. 2 is a set of curves further explaining the operation of the system. Fig. 3 is a block diagram of the transmitter and receiver equipment on the body and at the fixed stations.

Figures 1 and 3 represent an embodiment of my invention in which A and B are fixed transmitting stations of known geographical location which, by transmitters 11 and 12 respectively well known in the art, are designed to emit series of pulses of radio frequency energy of a known and accurately fixed recurrence rate, frequency, and duration. Suitable timing apparatus 13 is likewise provided whereby station B will operate in synchronism with station A, emitting pulses in a known and accurately determinable time relationship to those emitted by station A. Suitable receivers 14 and 15 respectively, well known in the art, are also provided at the stations for the reception of radio frequency pulses and for the accurate measurement and determination of their time relationship to other pulses emitted and received a time difference indicator 17 is shown associated with the receiver 14 at station A. The receivers 14, 15 and the indicator 17 may be of the types described in the aforesaid patent to J. A. Pierce et al. C represents a body which is equipped with known and suitable radio beacon transponder 16 which, upon reception of radio frequency pulses from either of the stations described above, will emit reply pulses of radio frequency energy at a known and determinable recurrence rate, frequency and duration.

Fig. 2 represents a simple embodiment of a navigational chart upon which is illustrated the hyperbolic and elliptical curves or "lines of position" for use in navigation as described below.

In operation, a pulse of radio frequency is emitted from station A and is received at body C which in turn automatically emits a reply pulse which is received at station A. Assuming no delay in operation of the beacon at C, the time interval between the transmission of the original pulse from station A and the reception of the reply pulse at station A will be proportional to the distance AC.

As station B is synchronized to operate with station A it will, after a known interval, also emit a pulse which will be received and replied to by the beacon at C. The time interval between the emission of the pulse from B and the reception of the reply pulse at B will be, assuming no delay in the beacon at C, proportional to the distance BC. It readily follows, therefore, that the difference in the two time intervals thus obtained may be expressed in a distance which is the difference between the two distances AC and BC.

A curve D, which is hyperbolic in form may now be drawn upon a chart, upon which the geographical locations of the two fixed stations A and B are positionally noted, through all points whose distances from the two stations A and B differ by the amount found from the observation just described.

The pulse of radio frequency energy that the beacon at C emits in reply to the pulse received from station B is, in the present invention, also received at station A. The time interval that will elapse between the emission of the pulse from station B and the reception at station A of body C's corresponding reply will be, assuming no delay in beacon C, proportional to the distance AC plus BC and may be readily expressed in terms of actual distance. A second curve E may now be drawn upon the aforementioned chart through all points whose sum of distances from stations A and B will be the distance found in the observation just described. This curve will be, by definition, in form of an ellipse circumscribed about A and B as the foci. Since the body C lies both on the hyperbolic and elliptical curves described above, the intersection of the two curves will be the position of the body C on the navigation chart.

Fig. 2 illustrates a simple embodiment of a navigation chart upon which A and B represent the two fixed transmitting stations of known geographical position. A family of hyperbolic curves may be calculated and plotted as indicated in which each individual curve represents the loci of all points whose difference in distance from stations A and B would be that of any value arbitrarily chosen. A second family of elliptical curves is illustrated in which each curve represents the loci of all points whose sum of distances from stations A and B would be that of any value arbitrarily chosen. The observations obtained as described above may then be interpolated directly upon this chart in order to readily locate positionally body C. It is pointed out that, because the hyperbolas and ellipses have common foci, everywhere on the chart the two families of curves are perpendicular to one another, an obvious advantage in accurate determination of the point of intersection and consequent location of body C.

It is recognized that, to those skilled in the art, there will be apparent various modifications and arrangements which may be made without departing from the spirit of the principles entailed.

What is claimed is:

1. A system of radio navigation of a body comprising a pair of synchronized radio stations at known geographical locations, each provided with a transmitter of time modulated pulses of radio frequency energy and a receiver therefor, the pulses transmitted by one of said stations having a known and fixed time relation to the pulses transmitted by the second of said stations, a pulse receiver-transmitter carried by said body and adapted to transmit pulses of radio frequency energy in response to pulses received from either of said stations, said receiver at each of said stations including means to measure the elapsed time between transmission of pulses from said stations and the reception of pulses transmitted from said body in response thereto, whereby representations are obtained of the sum and difference of the distances from said stations to said body.

2. A system of radio navigation of a body comprising a pair of synchronized radio stations of known geographical locations each provided with a transmitter of time modulated pulses of radio frequency energy and a receiver therefor, a pulse type receiver-transmitter carried by said body and adapted to transmit pulses of radio frequency energy in response to the reception of pulses from either of said stations, said receiver at each of said stations including means to measure the time intervals between transmission of pulses by said stations and the reception of pulses transmitted from said body in response thereto, whereby representations are obtained of the distances from each of said stations to said body, the sums and differences of said representations defining lines of position of said body with respect to hyperbolas representing differences of distances and ellipses representing sums of distances having the geographical locations of said stations as foci.

3. A system of radio navigation of a body comprising a pair of synchronized radio stations at known geographical locations, each provided with a transmitter of time modulated pulses of radio frequency energy and a receiver therefor, the pulses transmitted by one of said stations having a known and fixed time relationship to the pulses transmitted by the second of said stations, a pulse type receiver-transmitter carried by said body and adapted to transmit pulses of radio frequency energy in response to pulses received from either of said stations, said receiver being adapted to measure the time intervals between transmission of pulses by said stations and the reception of pulses transmitted from said body in response thereto, and means for deriving the sum of the time intervals and the difference of the time intervals representing the distances from each station to said body whereby representations are obtained defining the lines of position of said body with respect to hyperbolas representing differences of distances and ellipses representing sums of distances having the geographical locations of said stations as foci.

4. The method of obtaining data for use in an object locating system of the type which employs the technique of plotting a first and second series of hyperboles the foci of which represent first and second known geographical locations and plotting an intersecting series of ellipses the foci of which also correspond to said first and second known geographical locations, which includes the steps of radiating from a first station corresponding to said first known geographical location, regularly recurring A pulses, radiating from a second station corresponding to said second known geographical location, regularly recurring B pulses, corresponding A and B pulses being time modulated by a fixed known amount, detecting said A and B pulses at said moving object whose location is to be determined, reradiating from said object said A and B pulses a minimum time after their detection, detecting at said first station said reradiated A and B pulses and measuring at said first station the time lapse between the radiation of a particular A pulse and the subsequent detection of the reradiated A pulse at said first station and the time lapse between the radiation of the aforementioned particular A pulse and the detection of its corresponding reradiated B pulse.

5. A method of determining the geographical position of a body comprising the steps of radiating from a known first geographical position a series of recurring A pulses, radiating from a known second geographical position a series of recurring B pulses, corresponding A and B pulses being time modulated by a fixed known amount, detecting said A and B pulses at said body, reradiating from said body said detected A and B pulses, detecting at said first position said reradiated A and B pulses and measuring at said first position the time interval between radiation of an A pulse and the subsequent detection of the reradiated A pulse at said first position and the time interval between radiation of the aforementioned A pulse and the detection of its corresponding reradiated B pulse, plotting an ellipse having said first and said second position as foci, said ellipse being the locus of a point having a time interval which is the summation of the pulse propagation time between said first station and said body and the pulse propagation time between said second station and said body, and superimposing thereon the plot of the locus of a point representing the difference between the aforementiond pulse propagation times.

6. A method of determining the position of an object comprising the steps of radiating a series of recurring A pulses from a first known geographical station, radiating a series of recurring B pulses from a second known geographical station, each A pulse having a corresponding B pulse time modulated by a fixed known amount, radiating from said object a C pulse responsive to each A or B pulse received thereat, measuring at said first station the time interval between radiation of an A pulse and the subsequent reception of a responsive C pulse, measuring at said first station the time interval between radiation of a B pulse and reception at said first station of a C pulse radiated by said object in response to a B pulse, plotting an ellipse having said first and said second station as foci, said ellipse being the locus of all points having a time interval which is the summation of the pulse propagation time between said first station and said object and the pulse propagation time between said second station and said object, and superimposing thereon the plot of a hyperbola having said first and said second station as foci, said hyperbola being the locus of a point having a time interval which is the difference between the aforementioned pulse propagation times.

References Cited in the file of this patent

UNITED STATES PATENTS

| Number | Name | Date |
|---|---|---|
| 2,405,238 | Seeley | Aug. 6, 1946 |
| 2,408,048 | Deloraine et al. | Sept. 24, 1946 |
| 2,441,956 | Deloraine et al. | May 25, 1948 |
| 2,470,787 | Nosker | May 24, 1949 |
| 2,472,129 | Streeter | June 7, 1949 |
| 2,515,332 | Budenbom | July 18, 1950 |